US008875515B2

(12) United States Patent
Ast et al.

(10) Patent No.: US 8,875,515 B2
(45) Date of Patent: Nov. 4, 2014

(54) INTEGRATED GENERATOR COOLING SYSTEM

(75) Inventors: Gabor Ast, Schwaz (AT); Herbert Kopecek, Schwaz (AT); Sebastian Walter Freund, Unterfoehring (DE); Pierre Sebastien Huck, Munich (DE)

(73) Assignee: General Electric Company, Niskayuna, NY (US)

( * ) Notice: Subject to any disclaimer, the term of this patent is extended or adjusted under 35 U.S.C. 154(b) by 321 days.

(21) Appl. No.: 13/097,101

(22) Filed: Apr. 29, 2011

(65) Prior Publication Data
US 2012/0272648 A1 Nov. 1, 2012

(51) Int. Cl.
| F01K 13/00 | (2006.01) |
| F01K 25/00 | (2006.01) |
| F01K 25/08 | (2006.01) |
| F02C 6/18 | (2006.01) |
| F01K 27/00 | (2006.01) |
| F01K 27/02 | (2006.01) |
| F01K 9/00 | (2006.01) |

(52) U.S. Cl.
CPC ............... *F01K 13/00* (2013.01); *F01K 25/00* (2013.01); *F01K 25/08* (2013.01); *F01K 13/006* (2013.01); *Y02T 10/166* (2013.01); *F02C 6/18* (2013.01); *F01K 27/00* (2013.01); *F01K 27/02* (2013.01); *F01K 9/00* (2013.01)
USPC .......................................................... 60/645

(58) Field of Classification Search
CPC ....... F01K 27/02; F01K 13/006; F01K 25/00; F01K 27/00; Y02T 10/166; F02C 6/18
USPC ............................ 60/660, 645, 530, 651, 653
See application file for complete search history.

(56) References Cited

U.S. PATENT DOCUMENTS

| 4,262,485 A | * | 4/1981 | Kuroda et al. ................. 60/669 |
| 4,367,629 A |   | 1/1983 | Cann |

(Continued)

FOREIGN PATENT DOCUMENTS

| DE | 2852064 A1 | 6/1979 |
| DE | 102008006259 A1 | 7/2008 |
| GB | 856985 A | 12/1960 |

OTHER PUBLICATIONS

European Search Report and Written Opinion issued in connection with corresponding EP Application No. 12165995.7-1610 dated Apr. 30, 2014.

Primary Examiner — Christopher Jetton
Assistant Examiner — Wesley Harris
(74) Attorney, Agent, or Firm — Seema S. Katragadda

(57) ABSTRACT

An expansion system is presented. One embodiment of the expansion system that includes a pump configured to pressurize a condensed working fluid received from a condenser. The expansion system further includes a heat exchanger coupled to the pump and configured to vaporize the condensed working fluid received from the pump. The expansion system also includes an expander coupled to the heat exchanger and configured to expand the vaporized working fluid flowing from an inlet side of the expander to an outlet side of the expander. In addition, the expansion system includes a generator coupled to the expander and configured to generate energy in response to the expansion of the vaporized working fluid. Further, the expansion system includes an integrated cooling unit configured to convey at least a portion of the condensed working fluid from an inlet side of the generator to an outlet side of the generator to dissipate heat generated by the generator.

9 Claims, 6 Drawing Sheets

(56) References Cited

U.S. PATENT DOCUMENTS

| | | | |
|---|---|---|---|
| 5,440,882 A * | 8/1995 | Kalina | 60/641.2 |
| 6,112,544 A * | 9/2000 | Blatter et al. | 62/434 |
| 7,062,913 B2 * | 6/2006 | Christensen et al. | 60/651 |
| 7,638,892 B2 | 12/2009 | Myers | |
| 7,716,930 B2 | 5/2010 | Chillar et al. | |
| 7,841,306 B2 | 11/2010 | Myers et al. | |
| 2006/0101817 A1 | 5/2006 | Fukutomi et al. | |
| 2006/0185366 A1 | 8/2006 | Kahlbau et al. | |
| 2008/0252078 A1 * | 10/2008 | Myers et al. | 290/52 |
| 2009/0288410 A1 * | 11/2009 | Wolter | 60/517 |
| 2011/0239650 A1 * | 10/2011 | Amedick et al. | 60/670 |
| 2011/0314818 A1 * | 12/2011 | Breen et al. | 60/676 |

* cited by examiner

INTEGRATED GENERATOR COOLING SYSTEM

BACKGROUND

The invention relates generally to an expansion system and more specifically to an integrated cooling unit adapted for use in expansion systems.

Currently, extractive techniques are available to generate energy, such as electrical energy by utilizing working fluids. Each of these techniques is based on pressurizing, heating, and expanding a working fluid. One method of generating electrical energy from a stream of hot gas such as gas turbine or engine exhaust is to apply an organic Rankine cycle. In the organic Rankine cycle, the working fluid is pressurized and heated, and permitted to expand through the turbine generator. This expansion of working fluid may convert mechanical energy of the turbine generator into electrical energy. In one example, the expansion of the working fluid may cause rotation of a turbine wheel in the turbine generator. This rotation of the turbine wheel may further rotate a rotor inside a generator. The rotation of the rotor inside the generator, particularly a stator, is then utilized to generate electrical energy. However, while generating the electrical energy, there may be electrical and mechanical losses in the turbine generator. These electrical and mechanical losses in the turbine generator may further generate heat within the internal components such as the rotor, the bearings, and the stator of the generator. This heat needs to be discharged from the generator to prevent overheating of the internal components of the generator.

Certain currently available conventional techniques entail use of a dedicated cooling system using air, water, or oil to dissipate heat from the turbine generator into the ambient. However, the dedicated cooling system is disposed external to the organic Rankine cycle, and is configured to convey the fluids such as air, water, or oil from an external source to the turbine generator. Thus, implementing a separate cooling system with a separate cooling fluid increases the cost of manufacturing the system. Also, the cost of the cooling system is dependent upon the amount of heat to be dissipated, which in turn diminishes the efficiency of the Rankine cycle.

It is therefore desirable to develop a simple and cost effective cooling system that prevents the generator from overheating and also improves the efficiency of the cycle.

BRIEF DESCRIPTION

Briefly in accordance with one aspect of the technique, an expansion system is presented. The expansion system includes a pump configured to pressurize a condensed working fluid received from a condenser. The expansion system further includes a heat exchanger coupled to the pump and configured to vaporize the condensed working fluid received from the pump. The expansion system also includes an expander coupled to the heat exchanger and configured to expand the vaporized working fluid flowing from an inlet side of the expander to an outlet side of the expander. In addition, the expansion system includes a generator coupled to the expander and configured to generate energy in response to the expansion of the vaporized working fluid. Further, the expansion system includes an integrated cooling unit configured to convey at least a portion of the condensed working fluid from an inlet side of the generator to an outlet side of the generator to dissipate heat generated by the generator.

In accordance with a further aspect of the present technique, a method for dissipating heat from an expansion system is presented. The method includes pumping by a pump a condensed working fluid received from a condenser. Also, the method includes vaporizing by a heat exchanger the condensed working fluid received from the pump. The method further includes directing the vaporized working fluid through an expander to expand the vaporized working fluid while the vaporized working fluid flows from an inlet side of the expander to an outlet side of the expander. The method also includes generating energy by a generator in response to the expansion of the vaporized working fluid. Additionally, the method includes conveying by an integrated cooling unit at least a portion of the condensed working fluid from the pump to an inlet side of the generator. Further, the method includes dissipating heat from the generator while conveying the portion of condensed working fluid from the inlet side of the generator to an outlet side of the generator.

In accordance with another aspect of the present technique, an expansion system is presented. The expansion system includes a first Rankine cycle unit circulating a primary working fluid to generate a first energy. The first Rankine cycle unit includes a first pump configured to pressurize the primary working fluid received from a first condenser. The first Rankine cycle unit also includes a first heat exchanger coupled to the first pump and configured to vaporize the primary working fluid. Furthermore, the first Rankine cycle unit includes a first expander coupled to the first heat exchanger and configured to expand the vaporized primary working fluid flowing from an inlet side of the first expander to an outlet side of the first expander. In addition, the first Rankine cycle unit includes a first generator coupled to the first expander and configured to generate the first energy in response to the expansion of the vaporized primary working fluid. Further, the expansion system includes a second Rankine cycle unit cascaded to the first Rankine cycle unit and configured to circulate a secondary working fluid to generate second energy. The second Rankine cycle unit further includes a second pump configured to pressurize the secondary working fluid received from a second condenser. The second Rankine cycle unit also includes a second heat exchanger coupled to the second pump and configured to vaporize the secondary working fluid. Furthermore, the second Rankine cycle unit includes a second expander coupled to the second heat exchanger and configured to expand the vaporized secondary working fluid flowing from an inlet side of the second expander to an outlet side of the second expander. Additionally, the second Rankine cycle unit includes a second generator coupled to the second expander and configured to generate the second energy in response to the expansion of the vaporized secondary working fluid. Further, the expansion system includes an integrated cooling unit configured to convey at least a portion of the primary working fluid in a condensed form to the first generator to dissipate heat generated by the first generator and to the second generator to dissipate heat generated by the second generator.

In accordance with yet another aspect of the present technique, a waste heat recovery system is presented. The waste heat recovery system includes a heat generating subsystem which in turn includes at least a heat generating unit configured to produce heat. The waste heat recovery system also includes at least one Rankine cycle subsystem. The at least one Rankine cycle subsystem includes a pump configured to pressurize a condensed working fluid received from a condenser. The at least one Rankine cycle subsystem also includes a heat exchanger coupled to the pump and configured to vaporize the condensed working fluid based on the heat produced by the heat generating system. Furthermore, the at least one Rankine cycle subsystem includes an expander coupled to the heat exchanger and configured to expand the vaporized working fluid flowing from an inlet side of the expander to an outlet side of the expander. In addition, the at least one Rankine cycle subsystem includes a generator coupled to the expander and configured to generate energy in response to the expansion of the vaporized working fluid. Further, the waste heat recovery system includes an integrated cooling unit configured to convey at least a portion of the condensed working fluid from an inlet side of the generator to an outlet side of the generator to dissipate heat generated by the generator.

DRAWINGS

These and other features, aspects, and advantages of the present invention will become better understood when the following detailed description is read with reference to the accompanying drawings in which like characters represent like parts throughout the drawings, wherein.

Figure 4:
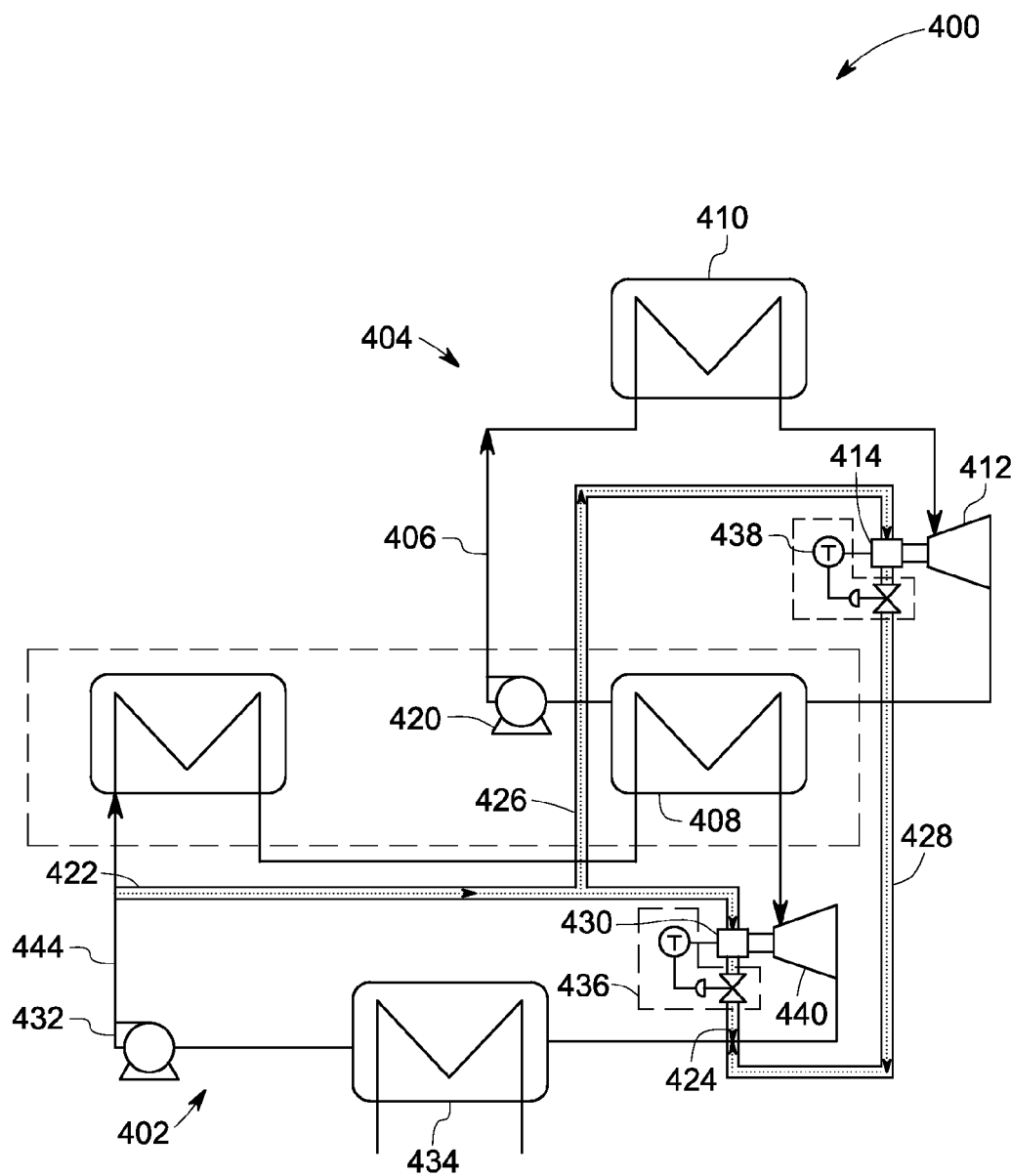
FIG. 4 is a schematic illustration of two integrated organic Rankine cycle systems having an exemplary integrated cooling unit, in accordance with aspects of the present technique.
Figure 5:
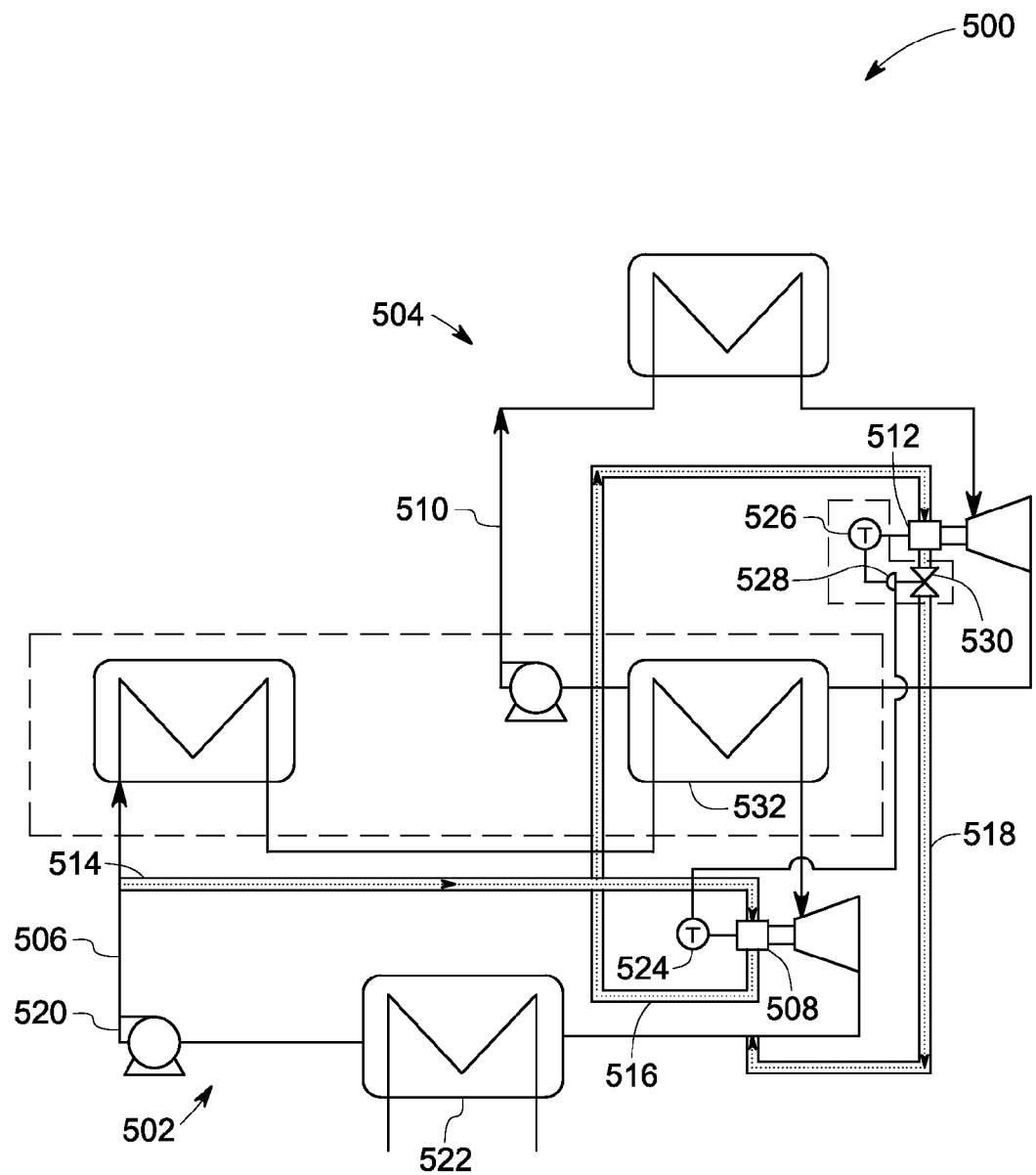
FIG. 5 is a schematic illustration of two integrated organic Rankine cycle systems having another embodiment of an integrated cooling unit, in accordance with aspects of the present technique.
Figure 6:
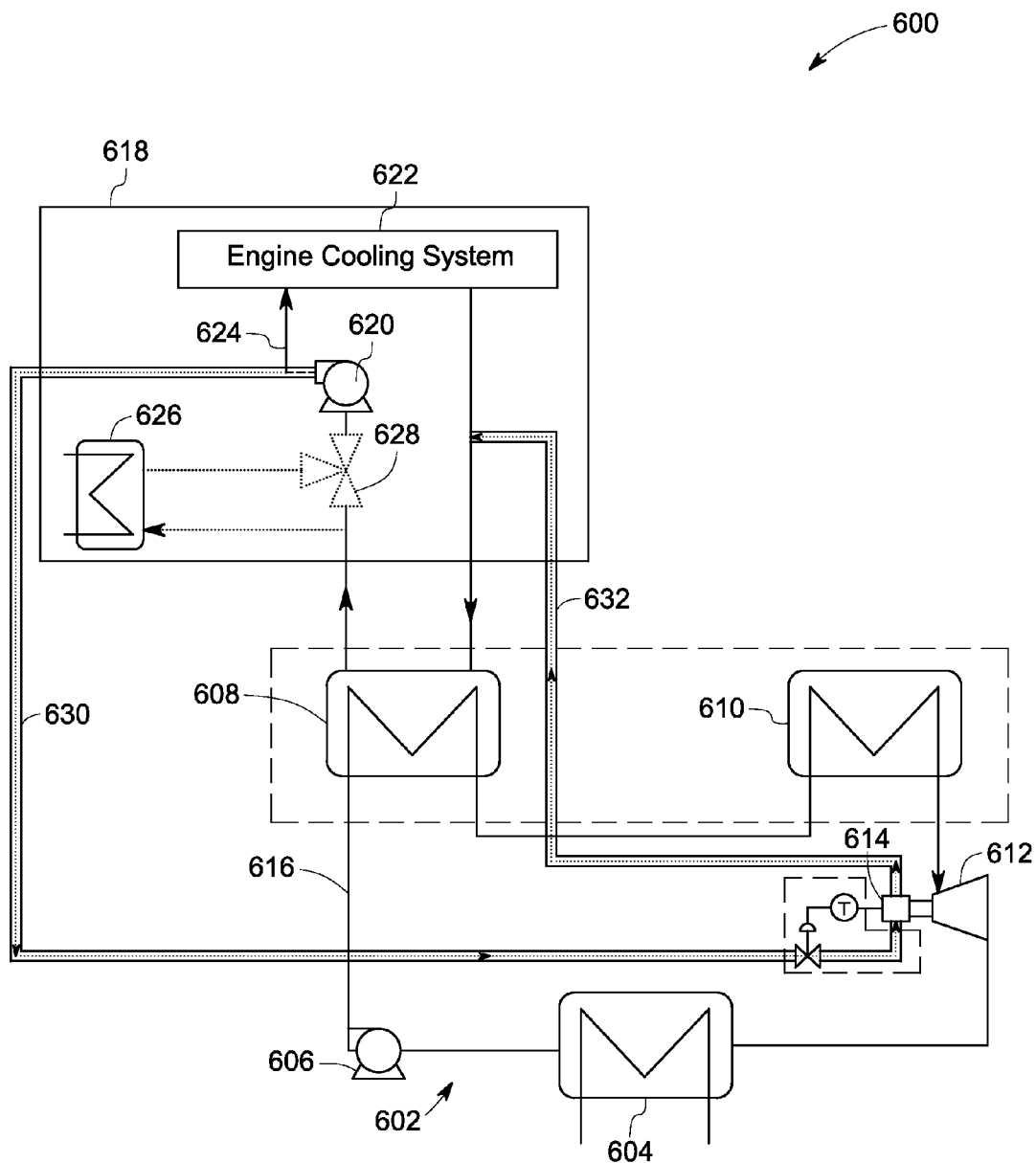
Figure 7:
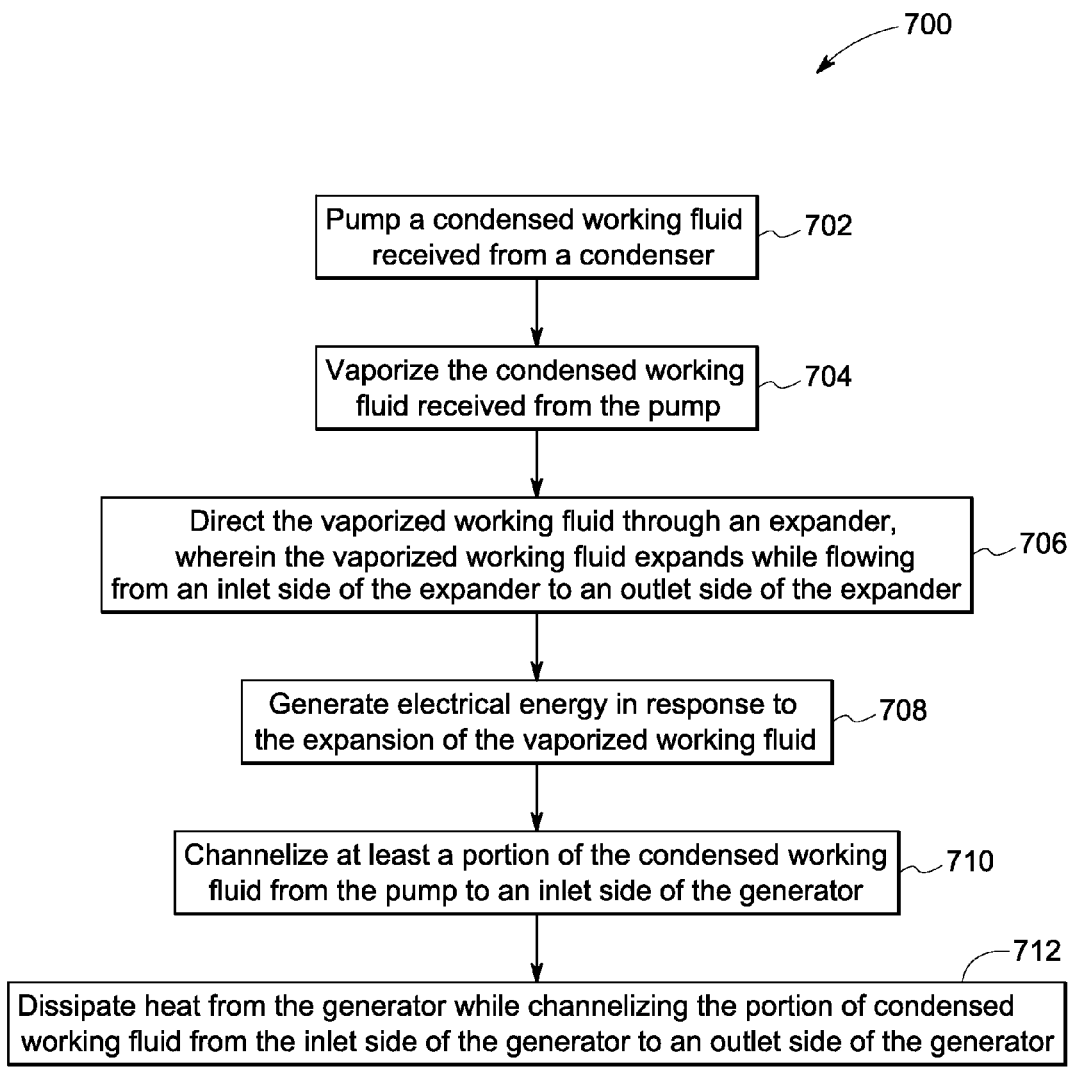

FIG. 6 is a schematic illustration of an expansion system having an exemplary integrated cooling unit coupled to a heat generating system, in accordance with aspects of the present technique; and FIG. 7 is a flow chart illustrating a method of dissipating heat from a generator using the exemplary embodiments of the integrated cooling unit of FIGS. 1-6, in accordance with aspects of the present technique.

DETAILED DESCRIPTION

As will be described in detail hereinafter, an expansion system having an exemplary integrated cooling unit and methods for dissipating heat from at least a generator in the expansion system by employing the various embodiments of the integrated cooling unit are presented.

Figure 1:
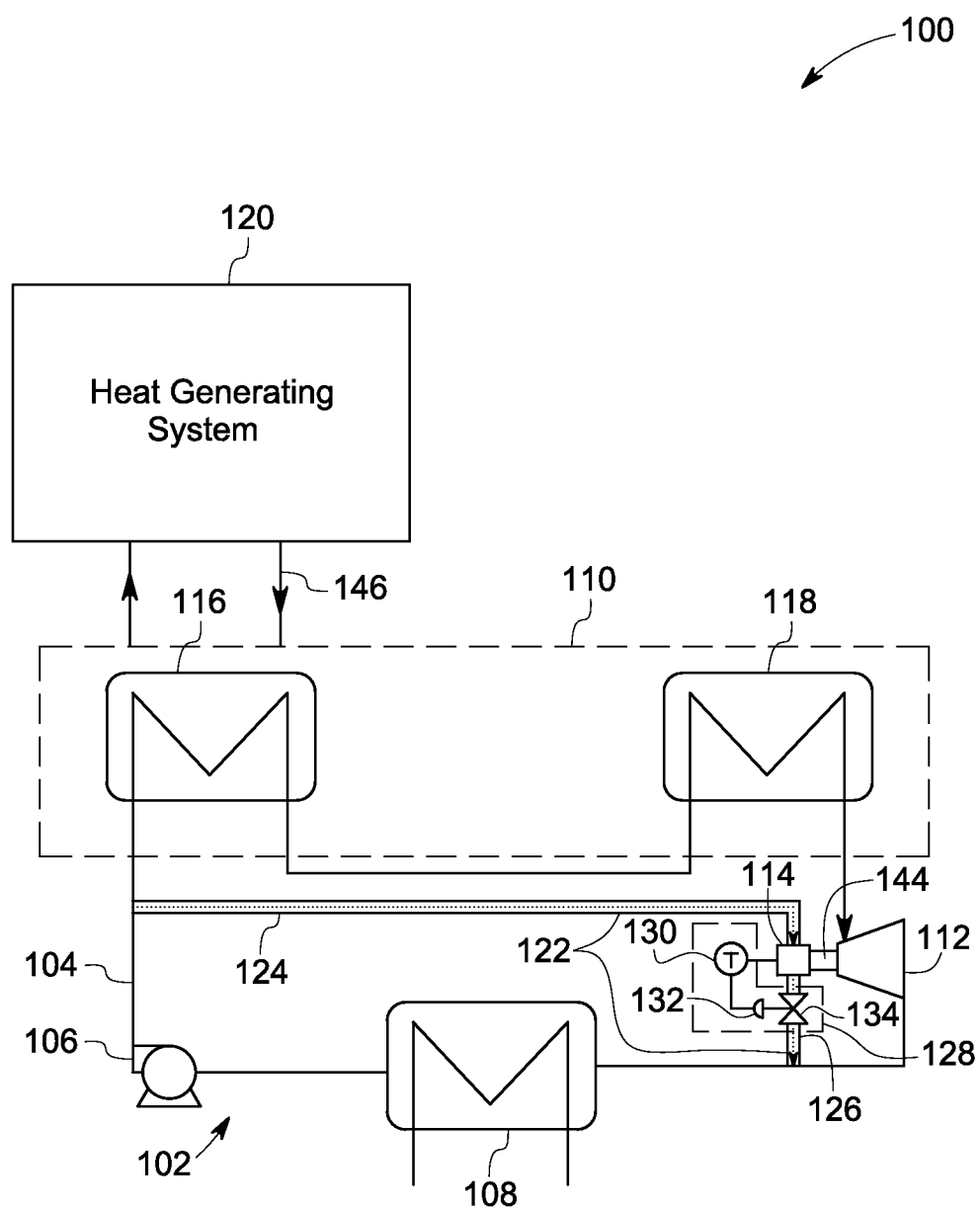
FIG. 1 is a schematic illustration of an expansion system having an exemplary integrated cooling unit, in accordance with aspects of the present technique.

Referring to FIG. 1, an expansion system 100 that includes an exemplary embodiment of an integrated cooling unit, in accordance with aspects of the present technique, is illustrated. The illustrated expansion system 100 includes an organic Rankine cycle (ORC) system 102 that circulates an engineered working fluid 104. The engineered working fluid 104 may include a high molecular mass organic fluid that is selected to efficiently convert heat from relatively low temperature heat sources such as a heat generating system 120 of FIG. 1, into mechanical energy.

In certain exemplary embodiments, the organic working fluid 104 may include cyclohexane, propane, butane, isobutane, pentane, isopentane, cyclopentane, thiophene, or combinations thereof. In certain other exemplary embodiments, the organic working fluid 104 may include R134a, R245fa, other refrigerants, or combinations thereof. It should be noted herein that list of organic working fluids is not inclusive and use of other organic working fluids applicable to organic Rankine cycles are also envisaged. Further, in certain embodiments, the organic working fluid 104 includes a mixture of such fluids.

In a presently contemplated configuration, the organic Rankine cycle system 102 includes a pump 106, a condenser 108, a heat exchanger 110, an expander 112, and a generator 114. The condenser 108 is configured to store a primary working fluid in a condensed form at about ambient temperatures. It may be noted that in the present example the primary working fluid is representative of the working fluid 104 that circulates in the organic Rankine cycle system 102. Also, the usage of the term "primary working fluid" in the following description is to differentiate from a secondary working fluid that circulates in the heat generating system 120, and is not limited by its order.

Furthermore, the pump 106 is coupled to the condenser 108 and configured to deliver or pump the condensed primary working fluid 104 from the condenser 108 to the heat exchanger 110. Particularly, the condensed primary working fluid 104 is pressurized during the process of delivering the condensed primary working fluid 104 to the heat exchanger 110. In one embodiment, the pump 106 may include a variable speed pump that is used to vary a pressure and mass flow associated with the condensed primary working fluid 104. By way of example, the condensed primary working fluid 104 may be supplied to the heat exchanger 110 at a pressure of about 11 bars and a temperature of about 50 degrees Celsius.

The heat exchanger 110 is configured to heat the condensed primary working fluid 104 to a gaseous state. In the illustrated embodiment of FIG. 1, the heat exchanger 110 includes a preheater unit 116 and an evaporator unit 118 that are employed to convert the condensed primary working fluid 104 to the gaseous state.

Moreover, the preheater unit 116 is coupled to the pump 106 and configured to receive the condensed primary working fluid 104 from the pump 106. The condensed primary working fluid 104 is then heated by using a warm secondary working fluid 146. By way of example, the secondary working fluid 146 may be obtained from a heat generating system such as an engine 120. Alternatively, the secondary working fluid may be obtained from other external heat sources such as boilers, gas turbines, engines, and geothermal brines. In another embodiment, the condensed primary working fluid 104 may be directly heated by the heat recovered as a byproduct from the existing process such as an industrial process producing waste heat.

Upon heating the condensed primary working fluid 104, the preheater unit 116 supplies the pressurized and heated primary working fluid to the evaporator unit 118. The evaporator unit 118 is coupled to the heat generating system 120. For example, the heat generating system 120 may be an exhaust unit of an engine. In one example, the temperature of the exhaust unit of the engine may be in the range from about 400 degrees Celsius to about 500 degrees Celsius. The evaporator unit 118 receives heat from the heat generating system 120 and converts a substantial portion of the heated primary working fluid received from the preheater unit 116 to a vapor state using the heat received from the heat generating system 120, in one example. Particularly, the evaporator unit 118 is configured to vaporize the primary working fluid so that the vaporized primary working fluid settles at a top portion of the evaporator unit 118. Further, the primary working fluid in a liquid state is collected at a bottom portion of the evaporator unit 118. In one example, the vaporized working fluid may be at a pressure of about 19 bars and a temperature of about 225 degrees Celsius. Alternatively, the heated primary working fluid may be converted to a vapor state by using the secondary working fluid 146 that is received from the heat generating system 120.

Furthermore, the vaporized primary working fluid generated by the evaporator unit 118 is then passed through the expander 112 to drive the generator 114. The expander 112 may be an axial type expander, a radial type expander, an impulse type expander, or a screw type expander. In one embodiment, the expander 112 includes a turbine wheel (not shown in FIG. 1) that is coupled to a rotor (not shown in FIG. 1) of the generator 114 via a shaft 144. Also, in one example, the rotor may be a magnetic rotor that rotates within the generator 114.

The vaporized primary working fluid may be conveyed from the evaporator unit 118 to the expander 112 through an inlet side of the expander 112. Subsequently, the vaporized primary working fluid may flow across the turbine wheel of the expander 112. Particularly, the vaporized primary working fluid expands as it flows across the turbine wheel, thereby acting upon the turbine wheel and causing rotation of the turbine wheel. This rotation of the turbine wheel is translated to the rotor of the generator 114. In one embodiment, the generator 114 includes a stator (not shown in FIG. 1) within which the rotor rotates due to rotation of the turbine wheel of the expander 112. This rotation of the rotor within the stator induces electrical energy in the generator 114. Thus, the kinetic energy of the turbine wheel in the expander 112 is used to generate electrical energy in the generator 114.

With continuing reference to FIG. 1, the expanded primary working fluid further flows from an outlet side of the expander 112 to an inlet side of the condenser 108. The condenser 108 is configured to remove the heat from the expanded primary working fluid. Upon removing the heat, the condensed primary working fluid is directed to the pump 106 to circulate again in the Rankine cycle system 102.

As will be appreciated, the generation of electrical energy by the generator 114 in the organic Rankine cycle system 102 results in generation of heat. This heat may damage components of the generator 114. Currently available generators typically use additional resources such as air, oil or water from an external cooling system to aid in the removal of heat. However, use of these additional external resources adds to the size and/or cost of manufacturing the Rankine cycle system 102 and reduces the efficiency.

In accordance with exemplary aspects of the present technique, the shortcomings of the currently available expansion systems may be circumvented via use of an integrated cooling unit 122. Particularly, in a presently contemplated configuration of FIG. 1, the integrated cooling unit 122 is shown as an integral part of the expansion system 100 and in particular the Rankine cycle system 102. The integrated cooling unit 122 is configured to convey a desired portion of the condensed primary working fluid from the pump 106 to the generator 114 to aid in the cooling of the generator 114. It may be noted that the terms "convey" and "channelize" may be used interchangeably. In one embodiment, the desired portion may be in a range of about 0.5% to about 5% of the condensed primary working fluid. In accordance with aspects of the present technique, the conveyed primary working fluid cools the generator 114 by absorbing or dissipating the heat from the generator 114. By way of example, the portion of the condensed primary working fluid 104 may be supplied to the generator 114 at a pressure of about 12 bars and a temperature of about 50 degrees Celsius.

To convey such a portion of the condensed primary working fluid, in one embodiment, the integrated cooling unit 122 employs a first channel unit 124 and a second channel unit 126 in one example. It should be noted that the usage of terms "first channel unit" and "second channel unit" is to simply differentiate the channel units, and is not limited by its order. In a presently contemplated configuration of FIG. 1, the first channel unit 124 is configured to guide at least the portion of the condensed primary working fluid from an outlet side of the pump 106 to an inlet side of the generator 114. In one example, a portion of about 0.5% to about 5% of the condensed primary working fluid is conveyed from the outlet side of the pump 106 to the inlet side of the generator 114. Further, the portion of the condensed primary working fluid flows through the generator 114, and exits at an outlet side of the generator 114. This flow of condensed primary working fluid through the generator 114 aids in dissipating the heat from the generator 114. Moreover, in one embodiment, the portion of the condensed primary working fluid may be partially heated by the dissipated heat while flowing from the inlet side of the generator 114 to the outlet side of the generator 114.

Upon exiting the outlet side of the generator 114, the second channel unit 126 conveys the partially heated primary working fluid back to the condenser 108 via a valve 134. The valve 134 is employed for regulating the flow of the condensed primary working fluid. As previously noted, the condenser 108 removes the heat from the partially heated primary working fluid, thereby allowing the cooled primary working fluid to circulate again in the Rankine cycle system 102. Thus, embedding the integrated cooling unit 122 within the Rankine cycle system 102 eliminates the need for an external cooling system for cooling components such as the rotor, the stator, and other components of the generator 114.

Furthermore, in other embodiments, the integrated cooling unit 122 may be used in other cycles or systems that involve the expansion of a primary working fluid and an electric generator. For example, the integrated cooling unit 122 may be employed in a gas pressure letdown system or a cryogenic expander system. In each of these systems, the primary working fluid may expand during a process that causes the turbine wheel to rotate, thereby permitting the generator 114 to generate electrical energy from the fluid expansion.

Moreover, as depicted in the exemplary embodiment of FIG. 1, the expansion system 100 includes a control unit 128 that is operationally coupled to the integrated cooling unit 122 and configured to control the pressure of the condensed primary working fluid in the integrated cooling unit 122. In particular, the control unit 128 is configured to control a pressure associated with the portion of the condensed primary working fluid that flows from the inlet side of the generator 114 to the outlet side of the generator 114. It may be noted that the flow of the condensed primary working fluid may be regulated or controlled by other alternative methods.

In the illustrated embodiment of FIG. 1, the control unit 128 includes a temperature sensor 130, a microcontroller 132, and a valve 134, in one embodiment. The temperature sensor 130 is coupled to the generator 114 and configured to sense a temperature of the generator 114. Particularly, the heat generated in the generator 114 may result in an increase in the temperature of the generator 114. The temperature sensor 130 is used to sense such an increase in the temperature. This in turn aids in dissipating heat from the generator 114.

In accordance with aspects of the present technique, the temperature sensed by the temperature sensor 130 is communicated to the microcontroller 132 that is disposed between the temperature sensor 130 and the valve 134. The microcontroller 132 controls an opening action and a closing action of the valve 134 that is coupled to the second channel unit 126. Particularly, the valve 134 opens or closes a flow path of the second channel unit 126 based on the sensed temperature of the generator 114. If it is determined that the sensed temperature of the generator 114 is higher than a desired temperature, the microcontroller 132 sends a corresponding control signal to the valve 134 to enlarge the flow path of the second channel unit 126.

Figure 2:
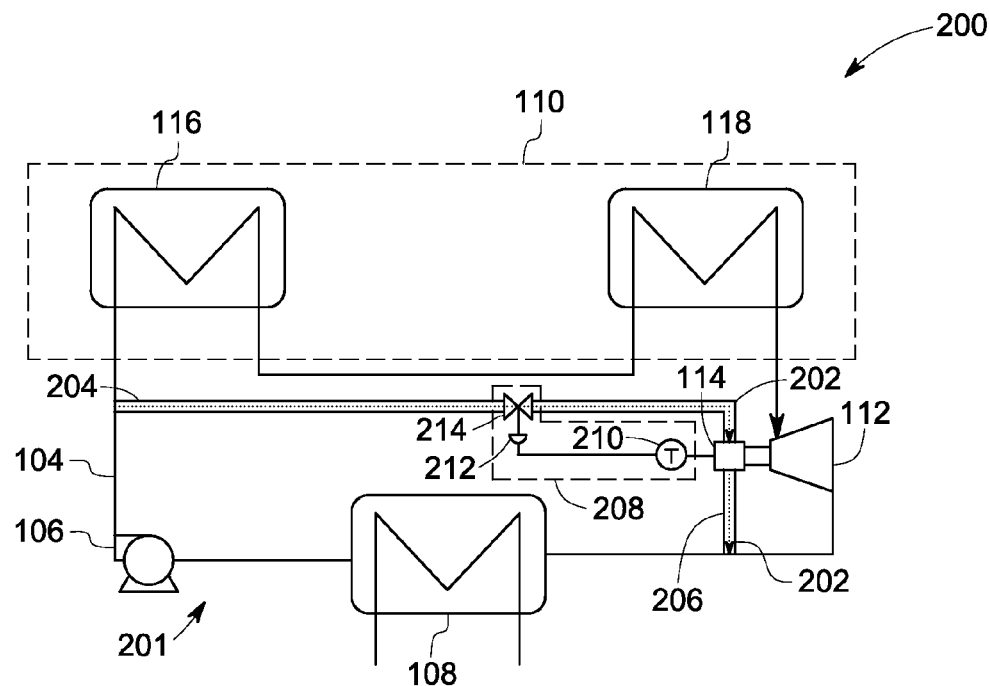
FIG. 2 is a schematic illustration of an expansion system having another embodiment of an integrated cooling unit, in accordance with aspects of the present technique.

Referring to FIG. 2, an expansion system 200 having another exemplary embodiment of an integrated cooling unit is illustrated. The illustrated expansion system 200 includes an organic Rankine cycle system 201 such as the Rankine cycle system 102 of FIG. 1. The Rankine cycle system 201 circulates a working fluid such as the primary working fluid 104 to convert heat energy to electrical energy. Also, for ease of use, similar reference numerals are employed to refer to common components across the various embodiments of the expansion system 200.

In the embodiment illustrated in FIG. 2, the expansion system 200 is shown as including another embodiment of an integrated cooling unit 202 to dissipate heat created in the generator 114. The integrated cooling unit 202 includes a first channel unit 204 that is operatively coupled between the pump 106 and an inlet side of the generator 114. The first channel unit 204 conveys or channelizes at least a portion of the condensed working fluid from the pump 106 to the generator 114. The portion of the condensed working fluid then flows through the generator 114, where the condensed working fluid cools the generator 114 by dissipating heat from the generator 114. Particularly, the portion of the condensed working fluid absorbs the heat from the generator 114 while flowing from the inlet side of the generator 114 to the outlet side of the generator 114. Consequently, a partially heated working fluid is obtained at the outlet side of the generator 114.

Further, the integrated cooling unit 202 includes a second channel unit 206 that conveys the partially heated working fluid from the outlet side of the generator 114 to an inlet side of the condenser 108. Particularly, the partially heated working fluid is conveyed or channelized back to the condenser 108, where the heat is removed from the working fluid and circulated again in the Rankine cycle system 202.

Moreover, in the illustrated embodiment of FIG. 2, the expansion system 200 further includes a control unit 208 configured to control a pressure associated with the portion of the condensed working fluid that is conveyed or channelized by the integrated cooling unit 202. The control unit 208 is coupled to the first channel unit 204 of the integrated cooling unit 202. Specifically, in the presently contemplated configuration of FIG. 2, the control unit 208 is positioned upstream of the generator 114. This arrangement of positioning the control unit 208 upstream of the generator 114 aids in controlling the pressure associated with the portion of the condensed working fluid before supplying the portion of the condensed working fluid to the generator 114. In yet another embodiment, the control unit 208 may be positioned either upstream and/or downstream of the generator 114.

Additionally, the control unit 208 includes a temperature sensor 210, a microcontroller 212, and a valve 214. The valve 214 is coupled to the first channel unit 204 that conveys the portion of the condensed working fluid. The valve 214 controls the pressure associated with the portion of the condensed working fluid based on the temperature of the generator 114 sensed by the temperature sensor 210. In another embodiment, the valve 214 may be disposed upstream and/or downstream of the primary working fluid to regulate or control the flow of the primary working fluid. Also, the temperature sensor 210 senses the temperature of the generator 114, and communicates the sensed temperature to the microcontroller 212. Upon receiving the sensed temperature, the microcontroller 212 sends a corresponding control signal to the valve 214 to vary a flow path of the first channel unit 204.

Figure 3:
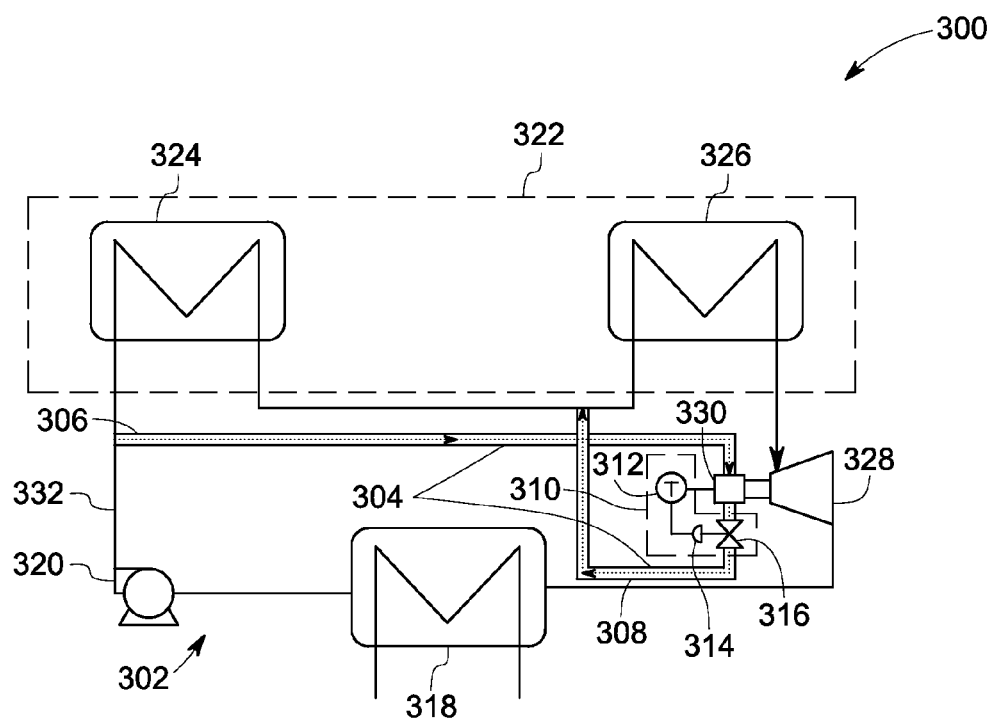
FIG. 3 is a schematic illustration of an expansion system having yet another embodiment of an integrated cooling unit, in accordance with aspects of the present technique.

Turning to FIG. 3, an expansion system 300 having yet another embodiment of an integrated cooling unit 304 configured to recycle a portion of working fluid that is employed to cool the generator 114 is depicted. The illustrated expansion system 300 includes an organic Rankine cycle system 302 that is similar to the organic Rankine cycle system 102 of FIG. 1. The organic cycle system 302 circulates a working fluid 332 to convert heat energy to electrical energy. The organic Rankine cycle system 302 includes a condenser 318 that is similar to the condenser 108 of FIG. 1. Additionally, the organic Rankine cycle system 302 includes a heat exchanger 322 that is similar to the heat exchanger 110 of FIG. 1 and an expander that is similar to the expander 112 of FIG. 1.

As previously noted, in the illustrated embodiment of FIG. 3, the expansion system 300 includes an integrated cooling unit 304 for dissipating heat that is generated in a generator 330. The integrated cooling unit 304 includes a first channel unit 306 and a second channel unit 308. The first channel unit 306 is coupled between a pump 320 and an inlet side of the generator 330 that is connected to an expander 328. The first channel unit 306 guides at least a portion of the condensed and pressurized working fluid 332 from the pump 320 to the generator 330. Thereafter, the portion of the working fluid 332 flows through the generator 330 to dissipate heat from the generator 330. Particularly, the portion of the working fluid 332 absorbs the heat from the generator 330 while flowing from an inlet side of the generator 330 to an outlet side of the generator 330.

Further, the second channel unit 308 is coupled between the outlet side of the generator 330 and an inlet side of an evaporator unit 326. The second channel unit 308 conveys the portion of the working fluid from the outlet side of the generator 330 to the inlet side of the evaporator unit 326. In the exemplary embodiment of FIG. 3, the portion of the working fluid that flows out of the generator 330 is a partially heated working fluid due to the heat absorbed from the generator 330. The partially heated working fluid is then conveyed to the evaporator unit 326 for generating a vaporized working fluid. Thereafter, the vaporized working fluid is supplied from the evaporator unit 326 to the generator 330 for converting heat energy to electrical energy. Thus, the partially heated working fluid obtained at the outlet side of the generator 330 is recycled to generate the electrical energy, which further aids in improving the efficiency of the expansion system 300. In another embodiment, the partially heated working fluid may be used as a byproduct fluid at a preheater unit 324 or the evaporator unit 326.

The expansion system 300 also includes a control unit 310. The control unit 310 includes a temperature sensor 312, a microcontroller 314, and a valve 316. The temperature sensor 312 is coupled to the generator 330 and configured to determine the temperature associated with the generator 330. The sensed temperature is then provided to the microcontroller 314. Upon receiving the sensed temperature, the microcontroller 314 controls the valve 316 coupled to the second channel unit 308. The valve 316 is either widened or narrowed based on the sensed temperature received from the temperature sensor 312. In the embodiment of FIG. 3, the movement of the valve 316 controls or varies the pressure of the portion of the working fluid flowing from the outlet side of the generator 330 to the inlet side of the evaporator unit 326. In yet another embodiment, the control unit 310 may be positioned upstream and/or downstream of the generator 330.

FIG. 4 illustrates an expansion system 400 having two integrated organic Rankine cycle system, in accordance with aspects of the present technique. The illustrated expansion system 400 includes a first Rankine cycle system 402 and a second Rankine cycle system 404. The first Rankine cycle system 402 is similar to the Rankine cycle system 102 of FIG. 1 except that the evaporator unit 118 of FIG. 1 is replaced by an evaporator/condenser unit 408, as depicted in FIG. 4. The first Rankine cycle system 402 may generally be referred to as a bottoming cycle, while the second Rankine cycle system 404 may generally be referred to as a topping cycle. A primary working fluid 444 that is similar to the primary working fluid 104 of FIG. 1 is circulated through the first Rankine cycle system 402 to convert heat energy to electrical energy. Similarly to the primary working fluid 444, a secondary working fluid 406 is circulated through the second Rankine cycle system 404 to convert heat energy to electrical energy. The first Rankine cycle system 402 is cascaded to the second Rankine cycle system 404 via the evaporator/condenser unit 408. It may be noted that the first Rankine cycle system 402 and the second Rankine cycle system 404 may also be referred to as a first ORC and a second ORC, respectively.

In the illustrated embodiment of FIG. 4, the second Rankine cycle system 404 includes a second pump 420 that is coupled to the evaporator/condenser unit 408. The evaporator/condenser unit 408 acts as the condenser in the second Rankine cycle system 404. Further, the second pump 420 pressurizes the secondary working fluid 406 received from the second condenser 408, and conveys the pressurized working fluid to a second evaporator unit 410. The second evaporator unit 410 vaporizes the received secondary working fluid 406 and a vaporized secondary working fluid is supplied to a second expander 412. In one embodiment, the second expander 412 may be a high temperature expander, while a first expander 440 in the first Rankine cycle system 402 may be a low temperature expander. Also, the second expander 412 includes a turbine wheel that is coupled to a rotor in a second generator 414. The vaporized secondary working fluid 406 may then pass through an inlet side of the second expander 412 and flow toward the turbine wheel. The secondary working fluid 406 expands as it flows across the turbine wheel, thereby acting upon the turbine wheel and causing rotation of the turbine wheel. Further, the rotation of the turbine wheel is translated to the rotor of a second generator 414, which in turn induces electrical energy in the second generator 414.

Also, in the illustrated embodiment of FIG. 4, the expansion system 400 includes another embodiment of the integrated cooling unit. Specifically, the integrated cooling unit includes a first channel unit 422, a second channel unit 424, a third channel unit 426, and a fourth channel unit 428, as depicted in FIG. 4. As previously noted, the usage of terms "first channel unit", "second channel unit", "third channel unit", and "fourth channel unit" is to simply differentiate the channel units, and is not limited by its order. The integrated cooling unit is configured to simultaneously convey at least a portion of the condensed primary working fluid 444 to a first generator 430 and the second generators 414.

The first channel unit 422 is coupled between a first pump 432 and the first generator 430 of the first Rankine cycle system 402. Further, the first channel unit 422 conveys at least a first portion of the condensed primary working fluid 444 from the first pump 432 to an inlet side of the first generator 430. The first portion of the condensed primary working fluid may flow through the first generator 430 and dissipate the heat from the first generator 430. The first portion of the condensed primary working fluid exits at an outlet side of the first generator 430. The first portion of the condensed primary working fluid that exits at the outlet side of the first generator 430 is then conveyed to a first condenser 434 by the second channel unit 424 coupled between the outlet side of the first generator 430 and an inlet side of the first condenser 434.

Moreover, in the exemplary embodiment of FIG. 4, the integrated cooling unit additionally includes the third channel unit 426 that is coupled between the first channel unit 422 and the second generator 414 in the second Rankine cycle system 404. By way of example, one end of the third channel unit 426 may be connected to the first channel unit 422 by a T-coupling unit, while the other end of the third channel unit 426 may be connected to the inlet side of the second generator 414. This third channel unit 426 may convey a part of the first portion of the condensed primary working fluid from the first channel unit 422 to the inlet side of the second generator 414 disposed in the second Rankine cycle system 404. The part of the first portion of the condensed primary working fluid flows through the second generator 414 and dissipates heat from the second generator 414.

In another embodiment, the third channel unit 426 may be coupled between the first pump 432 of the first Rankine cycle system 402 and the second generator 414 of the second Rankine cycle system 404. The third channel unit 426 may convey at least a second portion of the condensed primary working fluid from the first pump 432 in the first Rankine cycle system 402 to an inlet side of the second generator 414 disposed in the second Rankine cycle system 404. The second portion of the condensed primary working fluid flows through the second generator 414 and dissipates heat from the second generator 414. Upon dissipating the heat, the second portion of the primary working fluid exits from an outlet side of the second generator 414. This second portion of the primary working fluid is then conveyed to the first condenser 434 by the fourth channel unit 428.

In yet another embodiment, the second channel unit 424 and the fourth channel unit 428 may be configured to convey the partially heated working fluid from their respective generators to the evaporator/condenser unit 408. This arrangement benefits from recycling the partially heated working fluid to generate the electrical energy, which further helps in improving the efficiency of the expansion system 400.

Also, the expansion system 400 includes a first control unit 436 that is similar to the control unit 128 of FIG. 1. The first control unit 436 is coupled to the second channel unit 424 and configured to control the pressure associated with the first portion of the primary working fluid that flows through the second channel unit 424. The pressure is controlled based on a temperature of the first generator 430 in the first Rankine cycle system 402. In a similar manner, the expansion system 400 includes a second control unit 438 that is similar to the control unit 128 of FIG. 1. The second control unit 438 is coupled to fourth channel unit 428 and configured to control a pressure associated with the second portion of the primary working fluid that flows through the fourth channel unit 428. The pressure is controlled based on a temperature of the second generator 414 in the second Rankine cycle system 404. In yet another embodiment, the control units 436 and 438 may be positioned upstream and/or downstream of their respective generators.

Turning to FIG. 5, yet another embodiment of an expansion system 500 having two integrated organic Rankine cycle systems such as the two integrated Rankine cycle systems 402 and 404 of FIG. 4 in accordance with aspects of the present technique is illustrated. The illustrated expansion system 500 includes a first organic Rankine cycle system (bottom Rankine cycle system) 502 and a second organic Rankine cycle system (top Rankine cycle system) 504. The first organic cycle system 502 circulates a primary working fluid 506 that converts heat energy to electrical energy in a first generator 508 of the first Rankine cycle system 502. Similarly, the second organic cycle system 504 circulates a secondary working fluid 510 that converts heat energy to electrical energy in a second generator 512 of the second Rankine cycle system 504. During the process of generating electrical energy, enormous amount of heat is induced or created in both the generators 508 and 512. To dissipate the heat from the generators 508 and 512, an exemplary embodiment of an integrated cooling unit is embedded within the expansion system 500, in certain embodiments. The integrated cooling unit of FIG. 5 is a combination of a first channel unit 514, a second channel unit 516, and a third channel unit 518.

The first channel unit 514 is operatively coupled between a first pump 520 and an inlet side of the first generator 508 in the first Rankine cycle system 502. Also, the first channel unit 514 conveys at least a portion of the condensed primary working fluid 506 from the first pump 520 to the first generator 508. Further, this portion of the condensed primary working fluid flows through the first generator 508 to dissipate the heat created in the first generator 508. Thereafter, the portion of the condensed primary working fluid exits at an outlet side of the first generator 508. At the outlet side of the first generator 508, the portion of the primary working fluid may be partially heated due to the heat absorbed in the first generator 508.

Upon exiting the first generator 508, the partially heated primary working fluid is conveyed by the second channel unit 516. The second channel unit 516 is operatively coupled between the outlet side of the first generator 508 in the first Rankine cycle system 502 and an inlet side of the second generator 512 in the second Rankine cycle system 504. The second channel unit 516 is configured to convey the partially heated primary working fluid from the first generator 508 in the first Rankine cycle system 502 to the second generator 512 in the second Rankine cycle system 504. In accordance with aspects of the present technique, this flow of the partially heated primary working fluid is employed to further dissipate heat from the second generator 512 in the second Rankine cycle system 504.

Subsequently, the partially heated primary working fluid from an outlet side of the second generator 512 in the second Rankine cycle system 504 is conveyed to a first condenser 522 in the first Rankine cycle system 502 via the third channel unit 518. The third channel unit 518 may be coupled between the second generator 512 in the second Rankine cycle system 504 and the first condenser 522 in the first Rankine cycle system 502, as depicted in FIG. 5. It may be noted that the primary working fluid that flows through the first and second generators 508 and 512 is condensed enough to dissipate heat from both the generators 508 and 512. By way of example, the condensed primary working fluid first dissipates heat from the first generator 508 in the first Rankine cycle system 502. While dissipating heat from the first generator 508, the primary working fluid may be partially heated. However, the partially heated primary working fluid is still condensed enough to further dissipate heat from the second generator 512 in the second Rankine cycle system 504. Thus, in the exemplary embodiment of FIG. 5, the integrated cooling unit is implemented in a series configuration, where the condensed primary working fluid first flows through the first generator 508 in the first Rankine cycle system 502. Thereafter, the primary working fluid flows through the second generator 512 in the second Rankine cycle system 504 dissipating heat from the second generator 512. Consequently, the series configuration of the integrated cooling unit aids in dissipating heat from both the first generator 508 and the second generator 512 using the same portion of the primary working fluid.

In yet another embodiment, the third channel unit 518 may be coupled between the second generator 512 in the second Rankine cycle system 504 and an inlet side of an evaporator/condenser unit 532. The portion of the working fluid that flows out of the second generator 512 is a partially heated working fluid due to the heat absorbed from the second generator 512. The partially heated working fluid is then conveyed to the evaporator/condenser unit 532 for generating a vaporized working fluid. Thereafter, the vaporized working fluid is supplied from the evaporator/condenser unit 532 to the first generator 508 for converting heat energy to electrical energy. Thus, the partially heated working fluid obtained at the outlet side of the second generator 512 is recycled to generate the electrical energy, which further helps in improving the efficiency of the expansion system 500.

In addition, the expansion system 500 includes a control unit that is configured to control a pressure associated with the portion of the primary working fluid that flows through the third channel unit 518. The control unit, in one embodiment, includes a first temperature sensor 524, a second temperature sensor 526, a microcontroller 528, and a valve 530. The valve 530 is coupled to the third channel unit 518 and varies a flow path based on a temperature of the first generator 508 and/or a temperature of the second generator 512. Particularly, the microcontroller 528 receives temperature signals from the first temperature sensor 524 and the second temperature sensor 526. Subsequently, based on the received temperature signals, the microcontroller 528 sends a corresponding signal to the valve 530 so as to vary the pressure of the working fluid that flows through the third channel unit 518.

FIG. 6 is a schematic illustration of an expansion system 600 having an integrated cooling unit coupled to a heat generating system, in accordance with aspects of the present technique. The expansion system 600 includes a Rankine cycle system 602 that is similar to the Rankine cycle system 102 of FIG. 1. The Rankine cycle system 602 includes a condenser 604, a pump 606, a preheater unit 608, an evaporator unit 610, an expander 612, and a generator 614. Further, the Rankine cycle system 602 circulates a primary working fluid 616 that is similar to the primary working fluid 104 of FIG. 1 to convert heat energy to electrical energy.

In the illustrated embodiment, the expansion system 600 further includes a heat generating system 618 that is similar to the heat generating system 120 of FIG. 1. The heat generating system 618 is coupled to the Rankine cycle system 602. Furthermore, the heat generating system 618 includes a coolant pump 620 and an engine cooling system 622 that circulates a secondary working fluid 624. It may be noted that the secondary working fluid 624 is representative of an engine cooling fluid. The heat generating system 618 may optionally include an auxiliary engine cooler 626 and a valve 628 for condensing the secondary working fluid 624 prior to providing the secondary working fluid 624 to the coolant pump 620. The coolant pump 620 pressurizes the secondary working fluid 624 and supplies the pressurized secondary working fluid 624 to the engine cooling system 622. Further, the engine cooling system 622 generates a heated secondary working fluid at an output of the engine cooling system 622. The heated secondary working fluid is then supplied to the preheater unit 608 of the Rankine cycle system 602 to heat the primary working fluid 616 circulating in the Rankine cycle system 602.

Moreover, the expansion system 600 includes an integrated cooling unit to dissipate heat from the generator 614. In a presently contemplated configuration, the integrated cooling unit is a combination of a first channel unit 630 and a second channel unit 632. The first channel unit 630 is coupled between the coolant pump 620 of the heat generating system 618 and an inlet side of the generator 614 in the first Rankine cycle system 602. The first channel unit 630 conveys at least a sufficient portion of the secondary working fluid from the coolant pump 620 to the generator 614. The portion of the secondary working fluid flows through the generator 614 from an inlet side to an outlet side of the generator 614. While flowing through the generator 614, the portion of the secondary working fluid absorbs the heat from the generator 614.

Furthermore, the second channel unit 632 is coupled between the generator 614 and the heat generating system 618. The second channel unit 632 conveys the portion of the secondary working fluid from the outlet side of the generator 614 to the heat generating system 618. Since the portion of the secondary working fluid is partially heated while passing through the generator 614, the portion of the secondary working fluid received by the heat generating system 618 may be used to heat the primary working fluid in the preheater unit 608. In one embodiment, the portion of the secondary working fluid from the generator 614 may be mixed with the other portion of the secondary working fluid flowing toward the coolant pump 620.

It may be noted that the integrated cooling unit is not limited to conveying the portion of the secondary working fluid to the Rankine cycle system 602. It may be implemented in other Rankine cycle systems to convey portions of the secondary working fluid to other integrated Rankine cycle systems as depicted in FIGS. 4 and 5.

In one embodiment, the integrated cooling unit of FIG. 6 may be implemented in a parallel configuration, where the portion of the secondary working fluid from the heat generating system 618 may be simultaneously supplied to the first generator and the second generator in the integrated Rankine cycle systems of FIGS. 4 and 5.

In another embodiment, the integrated cooling unit may be implemented in a serial configuration, where the portion of the secondary working fluid first flows through the first generator, and then flows through the second generator of the integrated Rankine cycle systems of FIGS. 4 and 5. By way of example, the portion of the secondary working fluid flows from the heat generating system 618 toward the first generator 430 of FIG. 4. Upon cooling the first generator 430, the same portion of the secondary working fluid then flows from the first generator 430 to the second generator 414 of FIG. 4 to cool the second generator 414.

Referring now to FIG. 7, a flow chart 700 illustrating a method of dissipating heat from a generator such as the generator 114 of FIG. 1, in accordance with aspects of the present technique, is depicted. For ease of understanding of the present technique, the method is described with reference to the components of FIG. 1. The method begins at a step 702, where a condensed primary working fluid is pumped from a pump 106 to a heat exchanger 110. Particularly, the pump 106 receives the condensed primary working fluid from a condenser 108. Thereafter, the received primary working fluid is pressurized while conveying the primary working fluid to the heat exchanger 110.

Subsequently, at step 704, the heat exchanger 110 vaporizes the condensed primary working fluid received from the pump 106. Particularly, the heat exchanger 110 employs a preheater unit 116 to heat the condensed primary working fluid received from the pump 106. Further, the heat exchanger 110 employs an evaporator unit 118 to vaporize the heated primary working fluid received from the preheater unit 116. Thereafter, the vaporized primary working fluid is obtained at an output of the heat exchanger 110.

Also, at step 706, the vaporized primary working fluid is directed to an expander 112. Particularly, the vaporized primary working fluid flows from the heat exchanger 110 towards an inlet side of the expander 112. Further, the vaporized primary working fluid expands while flowing from the inlet side of the expander 112 to an outlet side of the expander 112. The expander 112 includes a turbine wheel that rotates while the primary working fluid flows across the turbine wheel. The rotation of turbine wheel further rotates a rotor in a generator 114. Further, a stator generates energy due to the rotation of the rotor. Thus, the generator 114 generates energy in response to the expansion of the vaporized primary working fluid, as depicted in step 708. In one embodiment, the energy generated may be an electrical energy or mechanical energy.

As previously noted, during the generation of electricity in the generator, heat is created. The various embodiments of the exemplary integrated cooling unit described hereinabove with reference to FIGS. 1-6 are employed to dissipate heat from the generator 114. Particularly, the integrated cooling unit 122 of FIG. 1 is an integral part of the expansion system 100. At step 710, an integrated cooling unit 122 conveys at least a portion of the condensed primary working fluid from the pump 106 to an inlet side of the generator 114. In one embodiment, the integrated cooling unit 122 includes a first channel unit 124 that is coupled between the pump 106 and the generator 114. The first channel unit conveys the portion of the condensed primary working fluid from the pump 106 to the generator 114. This portion of the condensed primary working fluid then flows through the generator 114 from an inlet side of the generator 114 to an outlet side of the generator 114.

Further, at step 712, the integrated cooling unit 122 dissipates heat from the generator 114 while conveying the portion of condensed primary working fluid from the inlet side of the generator 114 to the outlet side of the generator 114. Particularly, the portion of condensed primary working fluid absorbs heat from the generator 114 while flowing through the generator 114. Upon exiting the generator 114, the partially heated primary working fluid is directed to a condenser 108 by a second channel unit 126. The second channel unit 126 is coupled between the outlet side of the generator 114 and the condenser 108. Further, the partially heated primary working fluid is cooled at the condenser, and circulated again in the Rankine cycle system 102.

Thus, the various embodiments of the integrated cooling unit and the method for dissipating heat describes hereinabove aid in cooling at least the generator in the expansion system without a need for an external cooling system. Also, by embedding the integrated cooling unit within the expansion system, the size and/or cost of manufacturing the expansion system can be significantly reduced. Moreover, since the working fluid is itself used as a cooling fluid in the expansion system, there is no need for a separate or additional cooling fluid to be circulated in the expansion system. In addition, since the portion of the working fluid is partially heated due to the heat absorbed from the generator, the byproduct fluid or external heat that is required to heat the working fluid is also reduced. Furthermore, since the heat generated by the generator is utilized to heat the working fluid, the efficiency of the expansion system is significantly improved.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An expansion system, comprising:
   a pump to pressurize a condensed working fluid received from a condenser;
   a heat exchanger coupled to the pump to vaporize the condensed working fluid received from the pump, wherein the heat exchanger comprises a preheater unit to heat the condensed working fluid received from the pump and an evaporator unit to vaporize the heated working fluid received from the preheater unit;
   an expander coupled to the heat exchanger and to expand the vaporized working fluid flowing from an inlet side of the expander to an outlet side of the expander;
   a first generator coupled to the expander to generate electricity in response to the expansion of the vaporized working fluid; and
   a second generator operatively coupled to the first generator;
   an integrated cooling unit to convey at least a portion of the condensed working fluid to an inlet side of the first generator to dissipate heat generated by the first generator, wherein at least the portion of the condensed working fluid is partially heated by the dissipated heat, wherein the integrated cooling unit further recycles the partially heated working fluid by conveying the partially heated working fluid from the outlet side of the first generator to an inlet side of the second generator to dissipate heat generated by the second generator and convey the partially heated working fluid from an outlet side of the second generator to an inlet side of the condenser.

2. The system of claim 1, further comprising a control unit coupled to the integrated cooling unit to control a pressure associated with the portion of the condensed working fluid flowing from the inlet side of the first generator to the outlet side of the first generator.

3. The system of claim 2, wherein the control unit comprises:
   at least one temperature sensor to determine a temperature associated with the first generator;
   a microcontroller to generate a control signal based on the determined temperature; and
   at least one valve to control the pressure associated with the portion of the condensed working fluid based on the generated control signal.

4. The system of claim 3, wherein the at least one valve is positioned upstream of the first generator to control the pressure of the portion of the condensed working fluid prior to conveying the portion of the condensed working fluid to the inlet side of the first generator.

5. The system of claim 3, wherein the at least one valve is positioned downstream of the first generator to control the pressure of the partially heated working fluid flowing from the outlet side of the first generator.

6. The system of claim 1, wherein the pump, the heat exchanger, the expander, and the first generator form a Rankine cycle system.

7. A method for dissipating heat from an expansion system, the method comprising:
   pumping by a pump a condensed working fluid received from a condenser;
   vaporizing by a heat exchanger the condensed working fluid received from the pump;
   directing the vaporized working fluid through an expander to expand the vaporized working fluid while the vaporized working fluid flows from an inlet side of the expander to an outlet side of the expander;
   generating electricity by a first generator in response to the expansion of the vaporized working fluid;
   conveying by an integrated cooling unit at least a portion of the condensed working fluid from the pump to an inlet side of the first generator;
   dissipating heat from the first generator while conveying at least the portion of condensed working fluid from the inlet side of the first generator to an outlet side of the first generator, wherein dissipating the heat from the first generator comprises partially heating at least the portion of condensed working fluid by the dissipated heat; and
   recycling the partially heated working fluid by conveying the partially heated working fluid from the outlet side of the first generator to an inlet side of a second generator to dissipate heat generated by the second generator and conveying the partially heated working fluid from an outlet side of the second generator to an inlet side of the condenser.

8. The method of claim 7, further comprising controlling by a control unit a pressure associated with the portion of the condensed working fluid flowing from the inlet side of the first generator to the outlet side of the first generator.

9. The method of claim 8, wherein controlling the pressure associated with the condensed working fluid comprises:
   determining by a temperature sensor a temperature associated with the first generator; and
   varying by a valve the pressure associated with the condensed working fluid based on the determined temperature.

* * * * *